March 31, 1970  I. A. FERGUSON  3,503,130

FOLDING RULES

Filed Aug. 16, 1968

INVENTOR:

IAN AGAR FERGUSON

By: Jones & Bateman

Attys.

United States Patent Office 3,503,130
Patented Mar. 31, 1970

3,503,130
FOLDING RULES
Ian Agar Ferguson, Solihull, England, assignor to Rabone Chesterman Limited, Birmingham, England, a British company
Filed Aug. 16, 1968, Ser. No. 753,149
Claims priority, application Great Britain, Feb. 16, 1968, 7,624/68
Int. Cl. G01f 3/06
U.S. Cl. 33—105                           7 Claims

ABSTRACT OF THE DISCLOSURE

A folding rule having a pair of synthetic plastic legs interconnected by a knuckle joint, wherein metal washers are located in recesses in the interfaces of the knuckle joint transversely of its pivot axis.

---

This invention relates to folding rules of the kind having a pair of legs interconnected by a knuckle joint for angular movement between a folded position with the legs overlying one another in face-to-face contact, and a fully open position with the legs forming rectilinear extensions of one another.

In known rules of this kind, each leg is usually provided with a pair of mutually spaced lugs defining eye-parts of the knuckle joint, the eye-parts of the two legs being alternately positioned in alignment, with a hinge pin passing through the eye-parts. In such rules, there is often high frictional resistance to movement between adjacent interfaces of the eye-parts, especially when the legs and associated eye-parts are integrally formed from certain synthetic plastics materials, and this high resistance is inconvenient in use of the rule and can lead to breakage of the rule with forced folding or unfolding.

The principal object of this invention is to provide a rule of the above kind in which the frictional resistance to folding movement is controlled, thereby facilitating folding and unfolding of the rule and reducing the risk of breakage of the rule.

In accordance with this invention, a folding rule has a pair of legs interconnected by a knuckle joint for angular movement between a folded position with the legs overlying one another and a fully open position with the legs forming rectilinear extensions of one another, the knuckle joint comprising at least one eye-part on each leg and a hinge pin passing through and pivotally interconnecting the eye-parts, characterised by provision of a washer interposed between a pair of interfaces of the eye-parts and accommodated in a recess in one of the interfaces which recess serves to locate the washer relative to the eye-parts prior to insertion of the hinge pin through the eye-parts and through a hole in the washer.

A preferred embodiment of the invention is now described with reference to the accompanying drawings, wherein.

Figure 1:
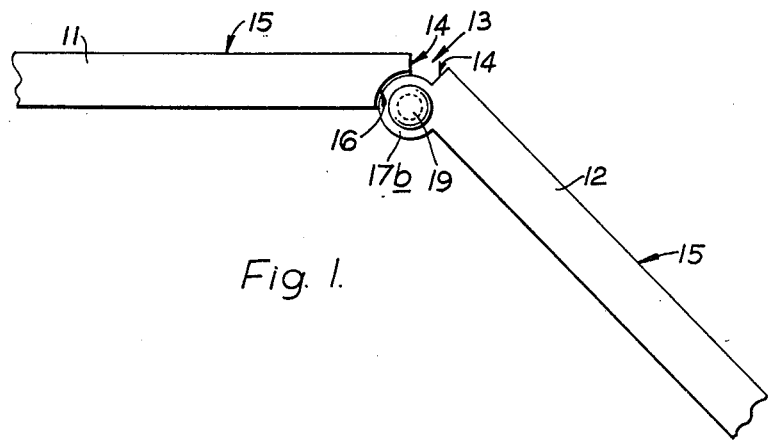
FIGURE 1 is a side elevation of a part of a rule according to the invention, showing the knuckle joint, the rule being in a position intermediate between the fully open and folded positions.

Referring to the drawings, the rule comprises a pair of graduated legs 11, 12 composed of synthetic plastics material such as a polycarbonate. The legs are interconnected by a knuckle joint 13 for angular, folding movement through approximately 180° between a fully open position wherein the legs form rectilinear extensions of one another, and a folded position wherein the legs are folded upon one another in relatively overlying, face-to-face contact. The folded position (not shown) is attained as by swinging leg 12 clockwise about pivot 19 until it is substantially parallel to leg 11.

Figure 2:
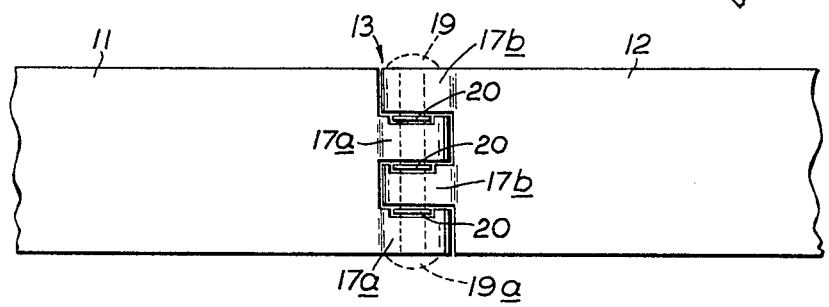
FIGURE 2 is an underside elevation of the part of the rule shown in FIGURE 1, the rule being in the fully open position.

The knuckle joint 13 includes eye-parts formed integrally with the legs 11, 12 each leg being provided with a pair of lugs defining eye-parts 17a, 17b, as described hereafter. In each leg 11, 12, one end portion is shaped to define an abutment surface 14 along the entire width of the leg, the abutment surface lying in a plane perpendicular to a graduated face 15 of the leg. Adjoining the abutment surface 14 is a concave indentation defining a shoulder 16 and each of the associated eye-parts 17a, 17b projects from the shoulder in a direction away from and oblique to the graduated face 15. The eye-parts are mutually spaced transversely of the leg with one eye-part adjoining one longitudinal edge of the leg and the other eye-part spaced from the opposite longitudinal edge of the leg, as shown in FIGURE 2. On each leg, the eyes of the two eye-parts are co-axially aligned transversely of the leg for receiving a hinge pin 19. Each eye-part has a substantially circular section, except where the eye-part is integrally connected to the corresponding leg, the curved peripheral surface of each eye-part being complementary to the concave shoulders 16 on the legs.

The two legs 11, 12 are interconnected by mutually interpositioning the eye-parts 17a, 17b on the two legs with interfaces of the adjacent eye-parts in contact or close proximity and with the eyes co-axially aligned, the hinge pin 19 being inserted through the eyes pivotally to interconnect the legs after washers 20 have been inserted between certain of the pairs of interfaces; in this example between the two outermost pairs of interfaces.

Figure 3:
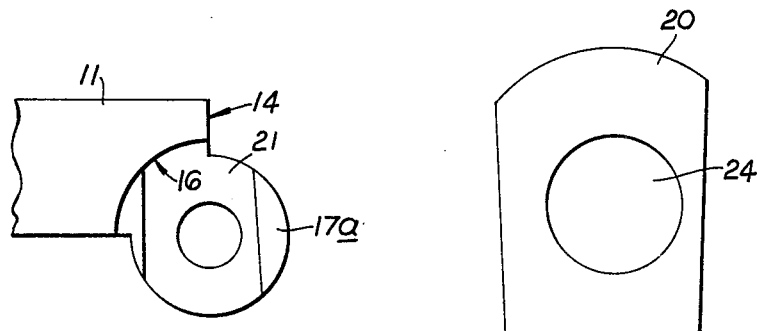
FIGURE 3 is an enlarged side elevation of the part of one of the rule legs as shown in FIGURE 2, before assembly of the rule, taken in the direction of arrow 3 in FIGURE 2.
Figure 4:
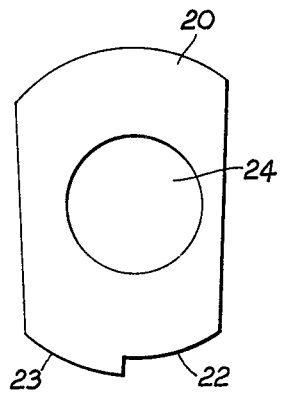
FIGURE 4 is an enlarged elevation of a washer as provided in the knuckle joint part of the rule shown in the previous figures.

To facilitate insertion of the washers 20, the two eye-parts 17a on leg 11 are each provided with a location recess 21 in an interface and an interface of one of the eye-parts 17b on leg 12 also has a location recess 21 so as to provide one recess associated with each pair of interfaces. As shown in FIGURE 3, the recess sides extend almost parallel to the abutment surface 14 of the corresponding leg 11, 12, the sides, in practice, being slightly convergent towards the abutment surface for convenience in moulding.

Each washer 20 is shaped complementary to a recess 21 and has a generally disc shape with side portions cut-away along two almost parallel chords on opposite sides of the circle centre. One arcuate edge 22 of the washer is stepped to provide a projection having a curved edge 23 complementary to the concave shoulders 16 on the legs. The washer hole 24 has a diameter greater than that of each of the eyes in the eye-parts 17a, 17b, i.e. is oversize with respect to the hinge pin 19, to facilitate assembly by rendering accuracy in location less critical. For example, where the diameter of the hinge pin 19 is in the region of 0.100 inch, the washer hole 24 may be oversize by 0.010 inch. The washer is preferably a stainless steel pressing and is slightly bowed to give the washer resilience.

In assembly of the folding rule, the eye-parts are mutually interpositioned with the eye-parts 17a alternately arranged in alignment with the eye-parts 17b. Each washer 20 is then slid into its respective location recess 21 with the stepped projection foremost so that the curved edge 23 of the projection seats on the complementary concave shoulder 16 of the corresponding leg 11. This seating of the washer on the shoulder 16 locates the washer hole 24 with respect to the eyes of the eye-parts 17a, 17b and after location of both washers, the hinge pin 19 is inserted through the eyes and the washer holes without the necessity to manipulate the washers. Finally the hinge pin is headed (at 19a in FIGURE 2) and in this operation the bowed washers are somewhat flattened so as to be in a state of strain.

In relative angular movement of the legs 11, 12, the curved peripheral surface of the eye-parts 17a, 17b turn in contact with respective concave shoulders 16 as shown in FIGURE 1. The folded condition of the rule is determined by face-to-face contact of the two legs (with the abutment surfaces 14 relatively co-planar). The abutment surfaces 14 approach one another as the legs are moved to the fully open position and, in the latter position, the surfaces abut one another to prevent further opening movement.

The engagement of interfaces of the eye-parts 17a, 17b with washers 20 instead of with interfaces of the eye-parts 17b, 17a respectively, reduces the overall frictional resistance of the knuckle joint to folding and unfolding, there being less friction between the engaged unlike surfaces of stainless steel and polycarbonate than would exist between engaged, like, polycarbonate surfaces. The slight bowing of the washers ensures contact between the washers and the corresponding interfaces and also by virtue of the resilience and state of strain of the washers provide a tensioning effect in the knuckle joint so as to ensure that the knuckle joint does not become too loose.

A complete folding rule may consist of a pair of two-leg rules as described above, one leg of one two-leg rule being pivotally connected to a corresponding leg of the other two-leg rule about an axis normal to each knuckle joint axis. The further pivotal connection may be made by interconnecting two plates (not shown) integrally moulded with the respective legs.

I claim:

1. A folding rule having at least one pair of legs interconnected by a knuckle joint for angular movement between a folded position with the legs in substantial abutment with one another in overlying relationship and a fully open position with the legs forming substantial rectilinear extensions of one another, the knuckle joint comprising at least one eye-part on each leg together defining a pair of interfaces, and a hinge pin passing through and pivotally interconnecting the eye-parts, characterised by provision of a pair of opposed shoulders on one of the interfaces defining a recess between the shoulders, and by provision of a washer accommodated between the interfaces and within the recess as a close fit between the shoulders, the washer having a hole receiving the hinge pin, the shoulders serving to locate the washer relative to the eye-parts prior to insertion of the hinge pin through the eye-parts and through the washer.

2. A folding rule according to claim 1, wherein said legs are lengths of synthetic plastic material, and said washer is a metal element shaped for insertion within said recess.

3. A folding rule according to claim 1, characterised in that the washer is a metal pressing having a bowed shape and which is stressed by heading of the ends of the hinge pin when the rule is assembled.

4. A folding rule according to claim 1, characterised by a further shoulder on the leg whose eye-part is provided with the recess, said further shoulder partially closing one end of the recess to limit movement of the washer into the recess.

5. A folding rule according to claim 1, wherein the leg carrying the eye-part formed with said recess is formed adjacent said recess with a flat end adapted for end abutment with another leg of the rule and an arcuate washer locating shoulder that extends over one end of the recess to intersect said flat end surface.

6. A folding rule according to claim 1, wherein said recess shoulders are substantially parallel and the washer is shaped generally complementary to said recess.

7. A folding rule according to claim 1 wherein a pair of mutually spaced eye-parts are provided on each leg, the eye-parts on one leg being alternately arranged with the eye-parts on the other leg, characterised by a washer interposed between each pair of interfaces of the eye-parts and accommodated in a recess in one of the interfaces in each pair.

References Cited
UNITED STATES PATENTS

| | | | |
|---|---|---|---|
| 825,329 | 7/1906 | Lemp | 287—100 X |
| 1,210,370 | 12/1916 | Dvorak | 33—118 X |
| 2,933,016 | 4/1960 | Kunde et al. | |

FOREIGN PATENTS

| | | |
|---|---|---|
| 152,797 | 8/1953 | Australia. |
| 286,042 | 3/1928 | Great Britain. |
| 482,569 | 7/1953 | Italy. |

HARRY N. HAROIAN, Primary Examiner

U.S. Cl. X.R.

330—715